Dec. 26, 1939.                C. T. SORENSEN                2,184,322
                            REFRIGERATING DEVICE
                            Filed July 10, 1936           2 Sheets-Sheet 1
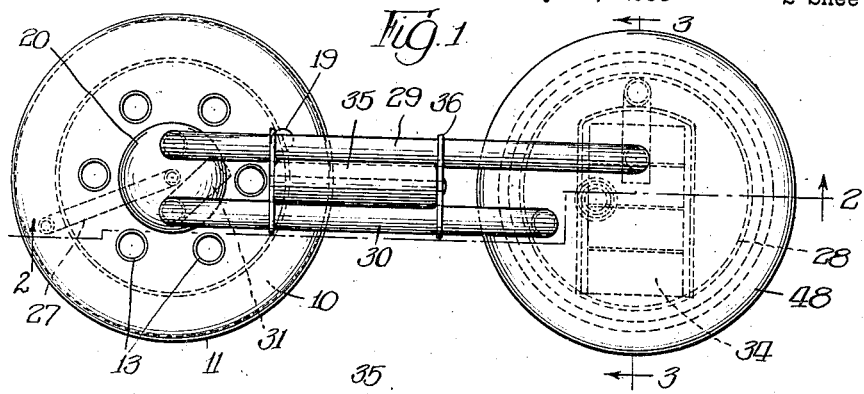
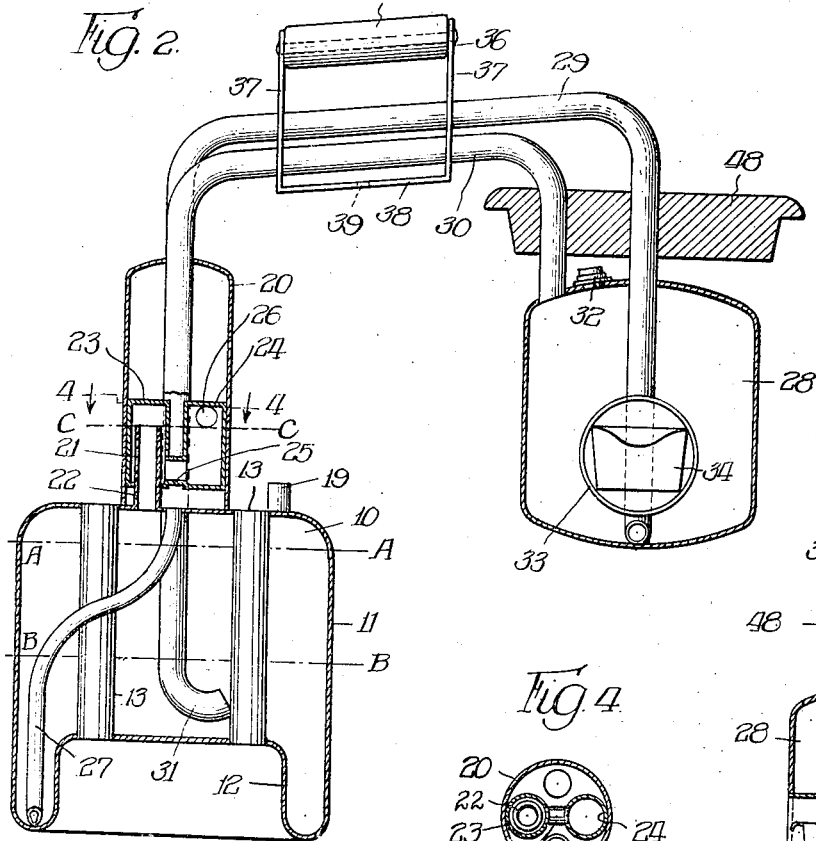
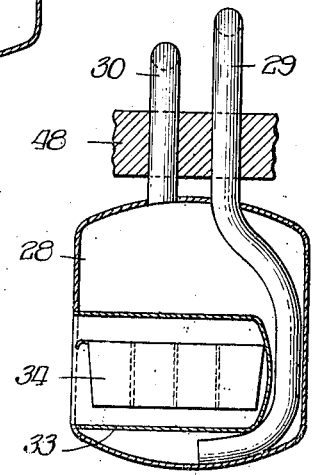
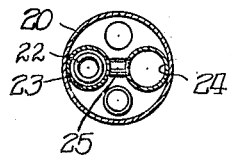
Inventor:
Clarence T. Sorensen,
By
    attys Dec. 26, 1939.     C. T. SORENSEN     2,184,322
REFRIGERATING DEVICE
Filed July 10, 1936     2 Sheets-Sheet 2
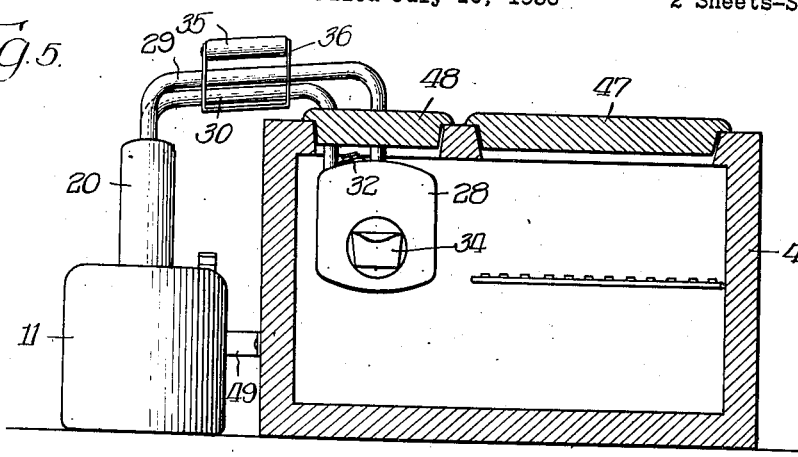
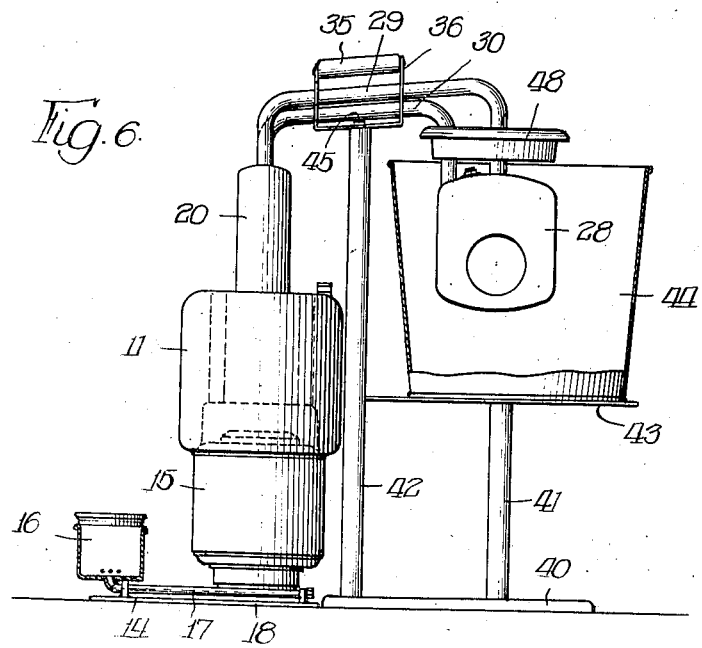
Inventor:
Clarence T. Sorensen Patented Dec. 26, 1939

2,184,322

UNITED STATES PATENT OFFICE 2,184,322

REFRIGERATING DEVICE

Clarence T. Sorensen, Lakewood, Ohio

Application July 10, 1936, Serial No. 89,900

8 Claims. (Cl. 62—120)

The present invention is related to refrigerating devices of the intermittent absorption type wherein water is used as the absorber and ammonia as the refrigerant.

The primary object of the invention is the production of a device of this character which is portable so as to adapt it to convenient handling and ready transportation, and one that can be manufactured at low cost to enable the same to be sold at a relatively low figure. The invention is capable of embodiment in such sizes as will permit its use in touring, camp trailers, cabins, cottages and for a variety of recreational and outdoor purposes where the use of ordinary refrigerators is impracticable.

A further object of the invention is the provision of a novel form of generator-absorber the construction of which is such as to obtain a much more rapid evaporation of the ammonia on the heating cycle, with a corresponding rapid cooling on the absorbing or refrigerating cycle, thus attaining actual refrigeration in greatly decreased time over the action of the forms of these refrigerating devices heretofore employed.

A still further object of the invention is the provision of a generator-absorber of novel construction to permit heating of the unit in the open or out-of-doors without wind or draft disturbing the operation of the heater.

Furthermore, the invention also aims to provide simple and efficient means to offset the effect of sudden expansion of the liquid in the generator-absorber, as by sudden or high heat, and to prevent the absorbent passing over to the condenser-evaporator due to the surging that arises by such sudden expansion.

Another object of the invention is the provision of an improved seal whereby to effect, during the heating cycle, a higher degree of removal of the absorbing liquid from the generated gases that pass to the condenser-evaporator, thus assuring a purer refrigerant reaching the condenser-evaporator.

Another object of the invention is the provision of a novel form of support for use with the unit during the heating cycle and the initial period of the absorbing or refrigerating cycle, which support is capable of ready assembly and disassembly, as occasion for its use may require, and is adapted to occupy but small space for storage and transportation purposes.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

While the form of the invention made the basis of the present disclosure is believed to be a preferred embodiment thereof, and shows a practical adaptation of the same to the uses and purposes for which it is intended, it will be understood that the present delineation is to be considered from an illustrative standpoint, and not as imposing restriction or limitation upon the invention.

In the drawings,

Fig. 1 is a top plan view of a refrigerating device constructed in accordance with the present invention;

Fig. 2 is a vertical longitudinal part sectional view thereof, as on the line 2—2, Fig. 1;

Fig. 3 is a vertical transverse sectional view of the condenser-evaporator, as on the line 3—3, Fig. 1;

Fig. 4 is a sectional plan view, as on the line 4—4, Fig. 2;

Fig. 5 is a longitudinal sectional view of a cabinet to which the hereindescribed refrigerating unit is applied, as in the absorbing or refrigerating cycle of the unit;

Fig. 6 is a side elevation of the unit in the position which it assumes during the heating cycle; and Fig. 7 is an elevation of the unit illustrating the position which it occupies at the end of the refrigerating cycle and prior to the commencement of the heating or generating cycle that follows.

Referring now in detail to the accompanying drawings, the numeral 10 designates generally the generator-absorber. This comprises an outer shell 11, and an inner shell 12 located in the lower portion of the outer shell. These shells are suitably connected together and formed of a metal that will withstand high pressures. The shell 12 is set within the shell 11, and it constitutes a combustion chamber for the generator-absorber as will appear at a later point herein.

Leading from the inner shell 12, or the combustion chamber formed thereby, and passing upwardly through the body of the generator-absorber, is a plurality of flues 13, the upper ends of the flues opening at the top of the generator-absorber, and thus communicating with the atmosphere at such point.

Associated with the generator-absorber 10 is a heating element 14, as appears in Fig. 6. This element is independent of the generator-absorber, and it includes a burner 15, of the blue-flame type, a source of fuel supply 16 for the same, and a pipe 17 which communicates with the fuel supply and the burner so as to feed to the burner the necessary fuel for maintaining its operation. These parts are mounted upon a common base 18, and the heater, as a unit, may be moved into operative relation with the generator-absorber or away from the latter. The fuel employed with the heating element preferably is kerosene, and the supply source 16 for the same is of such capacity as to hold only the necessary fuel to effect evaporation of the ammonia in the generator-absorber to constitute the proper charge for the condenser-evaporator for a single refrigerating cycle. When the fuel supply in the source 16 becomes exhausted, the burner 15 goes out, and by that time the heating or generating cycle has been completed. The heating unit forms no part of the present invention, as such, and is standard equipment of conventional type and procurable in the open market.

In the application of the heating element, after the burner 15 has been lighted, the element is moved into the position shown in Fig. 6, and in this position the upper end of the burner 15 lies within and fits closely against the lower end of the inner shell 12 of the generator-absorber, or the combustion chamber formed thereby. In such position the flame which rises from the burner 15 is protected against wind and draft, and the burner may readily operate without liability of the flame being blown out. This enables the heating cycle to be conducted in the open air and without disturbance by the elements.

At the commencement of the heating cycle the generator-absorber 10 is filled with liquid the level of which is designated by the line A—A. As before stated, this liquid is composed of water and ammonia. Hence, when heat is applied to the generator-absorber, as when the burner 15 is placed therebeneath, the temperature of the liquid is raised, with the result that the ammonia goes off in the form of a gas, and this is used to effect refrigeration as will later appear.

By the application of the flues 13 to the generator-absorber 10, the heating of the latter is greatly expedited, due to the fact that the heat from the burner 15 and the products of combustion therefrom pass up through the flues 13, and by radiation the liquid within the generator-absorber becomes quickly raised in temperature. By referring to Fig. 1. it will be observed that the flues 13 are concentrically arranged within the generator-absorbed 10, the surfaces of these flues thus giving to the body of liquid within the generator-absorber a large area of contact with the resulting speedy heating of the liquid.

The generator-absorber 10 is also provided with a charging fitting 19, which is illustrated only conventionally in the drawings. The purpose of this fitting is for evacuating the generator-absorber and charging the same with the liquid, and also to permit purging of the generator-absorber of any non-condensable gases at the time of manufacture of the unit. Any desired fitting of this type may be employed.

Arranged at the top of the generator-absorber 10 is a surge chamber 20. This chamber is generally circular in contour and constitutes an expansion chamber to take care of the sudden expulsion of the absorbent or liquid in the generator-absorber which may arise by the sudden application of heat or the too sudden rise in temperature of the liquid.

At the lower end of and enclosed by the surge chamber 20 is a liquid seal 21, which constitutes also a rectifier or analyzer for the gases discharged from the generator-absorber. This seal includes a vertically-disposed gas tube 22 the lower end of which is in communication with the upper end of the generator-absorber 10. The length of the tube 22 may vary in accordance with the point at which it is desired to maintain the level of the liquid within the seal, the upper end of said tube 22 marking the location of that level. The gas tube 22 projects into a receiving tube 23 which is of larger diameter than the gas tube 22, the tube 23 being closed at its upper end, and thus confining within the tube 23 the liquid and gases that may enter therein. Associated with the receiving tube 23 is a delivery tube 24 which corresponds in shape and size to the receiving tube 23. A connecting nipple 25 is arranged at the lower ends of the tubes 23 and 24 and affords communication between these tubes. The delivery tube 24, at opposite points in its upper portion, is provided with a pair of discharge ports 26, and these ports establish communication between the interior of the delivery tube 24 and the interior of the surge chamber 20.

Assuming that liquid is present in the seal 21 up to the level indicated by the line C—C, it will be apparent that this liquid will occupy the lower ends of the tubes 23 and 24, and its level will be on a line with the upper end of the gas tube 22. Both of the tubes 23 and 24, and the connecting nipple 25, will be filled with the liquid up to the line indicated. The gas tube 22 will remain in open communication with the generator-absorber 10, and the discharge ports 26 likewise will be in open communication with the interior of the surge chamber 20.

As the ammonia is evaporated by the heat applied to the generator-absorber 10 the gas arising will pass upwardly through the tube 22 and accumulate in the upper end of the receiving tube 23 above the surface of the liquid in the seal. When pressure has risen to a sufficient degree the gas will be forced downwardly through the liquid to the lower end of the tube 23 and passed through the connecting nipple 25 into the discharge tube 24 in which the gas will rise through the liquid and pass out of the discharge ports 26 to the interior of the surge chamber 20. This passage of the ammonia gas will continue so long as the ammonia is evaporated from the liquid contents of the generator-absorber 10.

To provide for drainage of the surge chamber 20 a drain pipe 27 is employed. The upper end of this pipe 27 connects with the lower end of the surge chamber 20, the lower end of said pipe being positioned in the bottom of the generator-absorber 10 and at the lowest point therein. The reason for this is to establish a seal for the lower end of the drain pipe and to cover such lower end at all times by the liquid which remains in the generator-absorber. Should it occur that the liquid of the generator-absorber, due to sudden expansion, is projected into the surge chamber 20, it would find its way through the gas tube 22 into the receiving and delivery tubes 23 and 24 of the seal 21 and out through the discharge ports 26. But the liquid would go no further. The seal 21 with its tubes 23 and 24 serve to retard the movement of the liquid in its surging action and combine with the chamber 20 to control and disperse such action. The surge chamber 20 acts also in the capacity of a trap, thereby controlling further expansion of the liquid, and such liquid as may find its way into the surge chamber 20 will pass out through the drain tube 27 and be conducted back to the interior of the generator-absorber 10. The drain pipe 27, in returning the liquid to the generator-absorber 10, after the liquid has been trapped in the chamber 20, supplements the action of the chamber 20 and combines with the same in dispersing the surge due to the expansion of the liquid in the generator-absorber.

More or less of the absorbent goes over with the ammonia gas as the latter passes into the gas tube 22, but as the seal 21, of which the tubes 23 and 24 form a part, serves as a rectifier or analyzer, the absorbent is separated from the gas and is entrained by the body of liquid which is within the seal. As this body increases in volume the sulplus thereof will drain back into the generator-absorber through the gas tube 22. Thus, the level of the liquid within the seal is always maintained at the top of the gas tube 22.

The numeral 28 designates the condenser-evaporator of the hereindescribed refrigerating device. It is a hollow shell constituted of metal sufficient to withstand the pressures to which the same may be subjected, and through the medium of this condenser-evaporator the refrigerating cycle is attained. For connecting the condenser-evaporator 28 with the generator-absorber 10 a vapor delivery pipe 29 is employed. One end of the pipe 29 connects with the upper end of the surge chamber 20, and thereby receives the ammonia gas to convey the same to the condenser-evaporator 28. This pipe is substantially U-shaped, its shorter leg being connected to the surge chamber 20, as referred to. The other or longer leg of the pipe 29 passes through the top of the condenser-evaporator 28 and extends downwardly therethrough to the bottom of the condenser-evaporator. At this point it is bent horizontally so as to discharge at the lowest point of the condenser-evaporator, and thereby build up a head of pure ammonia to the necessary level so that the lower end of the vapor delivery pipe 29 will be sealed by this body of ammonia.

The condenser-evaporator 28 also is connected with the generator-absorber 10 by a vapor return pipe 30. This pipe also is generally U-shaped, its shorter leg being connected to the top of the condenser-evaporator 28 and in communication with the interior thereof. The longer leg of the vapor return pipe 30 passes downwardly through the surge chamber 20, and also through the generator-absorber 10, and its lower end terminates at a point in proximity to the inner shell 12, at which point the lower end of the vapor return pipe 30 is bent to form an elbow 31.

The pipe 30 serves to conduct the ammonia gas from the condenser-evaporator 28, which arises during the refrigerating cycle, back to the generator-absorber 10 to be re-absorbed by the liquid in the generator-absorber. The purpose of curving the discharge end of the vapor return pipe 30 to form the elbow 31 is to set up in the liquid remaining in the generator-absorber an agitation or mixing action on the return of the ammonia from the condenser-evaporator, and this increases the absorbing action of the returning gases.

Because of the high pressures to which the condenser-evaporator is subjected it is necessary that the same be equipped with means to prevent rupture thereof in the event that the pressure exceeds the strength of the condenser-evaporator. To this end the latter is provided with a safety device 32 such as now is in common use with absorption type refrigerators. These devices are of approved design, and in the event that an excessively high pressure is generated the device 32 will rupture so as to relieve the excessive pressure. As will later appear, the safety device 32 is applied at a point which will permit the escaping gas, should the device be ruptured, to be absorbed by a body of water and thereby prevented passing into the atmosphere.

One side of the condenser-evaporator 28 is open and fitted therein is an ice cube shell 33. This shell has a closed drawn inner end, the outer end of the shell being fastened to the wall of the condenser-evaporator 28 so as to make a gas and liquid-tight connection therewith. Within the shell 33 is disposed an ice cube tray 34 made of suitable metal and provided with the usual removable partitions to form the ice cubes at the time of freezing.

The discharge end of the vapor return tube 30 is covered by the liquid within the generator-absorber and is always sealed by that liquid. When the heating or generating cycle has been completed, and the ammonia has been driven off from the liquid within the generator-absorber, the level of the liquid that remains is represented by the line B—B, but this is sufficient to seal the end of the vapor return tube. At this time, however, the body of ammonia within the condenser-evaporator 28 is much greater than the residual body of liquid represented by the level B—B in Fig. 2. The liquid in the generator-absorber thus presenting less resistance to the passage of the gas on its return from the condenser-evaporator than the body of ammonia within the latter which seals the end of the vapor delivery pipe 29, there will be no return of the ammonia through the vapor delivery pipe 29 to the generator-absorber, but such return will be through the vapor return pipe 30.

For the convenient handling of the hereindescribed refrigerating device the same is provided with a handle 35. This is mounted in a supporting frame 36 generally U-shaped. The end members 37 of the frame 36 are provided with openings arranged in aligned pairs, the vapor delivery pipe 29 and the vapor return pipe 30 passing through these openings and thereby supporting the frame 36. The bottom member 38 of the frame 36 has an opening 39 formed therein the purpose of which presently will appear.

During the heating or generating cycle it is necessary that the condenser-evaporator 28 shall be reduced in temperature in order to effect condensation of the ammonia vapors as they come over from the generator-absorber, and to provide the requisite body of liquid ammonia to effect refrigeration. To the accomplishment of this end, as illustrated in Fig. 6, the condenser-evaporator 28 is immersed in a body of water and there remains until the heating cycle has been completed. For the convenient application of the condenser-evaporator to the cooling body of water, I have devised a novel form of support which is illustrated in Fig. 6. This comprises a base 40 from which rises two supporting standards 41 and 42. The supporting standard 41 is shorter than the standard 42, and at its upper end the standard 41 is provided with a supporting shelf 43 upon which a bucket 44, or other similar receptacle, may be sustained, with the requisite amount of cooling water for the condenser-evaporator 28 when it serves as a condenser. The upper and lower ends of the standard 41 are screw-threaded so as to detachably engage the base 40 and the supporting shelf 43, whereby the parts may be quickly assembled when erecting the supporting device, and as quickly separated when the necessity for use of the device is passed.

The supporting standard 42 has its lower end screwthreaded for detachable engagement with the base 40. At its upper end the standard 42 is provided with a stud or pin 45 which is designed to fit within the opening 39 of the handle frame 36, and thereby hold the hereindescribed refrigerating unit, during the heating cycle, with the condenser-evaporator 28 properly positioned within the bucket 44, and with the generator-absorber 10 also properly positioned for application of the heating unit 14 thereto.

To obtain the refrigerating effect of the present invention during the refrigerating or absorbing cycle, the device in its entirety, is associated with a cabinet 46 of conventional type and insulated and of proper construction for efficient operation. This cabinet is provided with a major opening closed by a cover 47, suitably insulated and constructed to insure the refrigerating effects of the cabinet. Through this opening the various articles to be refrigerated or which have been refrigerated may be introduced to and removed from the cabinet. The latter also is provided with an additional opening that is closed by a unit cover 48, which is carried by and forms a part of the hereindescribed refrigerating unit. Obviously, the unit cover 48 should be properly insulated so that when applied to the cabinet the refrigerating effects may be assured. It will be observed that the unit cover 48 is associated with and carried by the vapor delivery pipe 29 and the vapor return pipe 30, and is positioned adjacent to the condenser-evaporator 28. Because of this relation between the unit cover 48 and the condenser-evaporator the safety device 32 is protected against accidental injury and damage. When the refrigerating device is applied to the cabinet 46, and the unit cover 48 is positioned to close the opening of the cabinet with which it is intended to be used, the cover 48 serves not only to support the unit in proper relation to the cabinet, but it locates the condenser-evaporator 28 properly within the cabinet, and also locates the generator-absorber properly in relation to the exterior of the cabinet. At this point a support 49 is affixed to the cabinet 46, the generator-absorber cooperating with this support and being held thereby in proper location and in vertical position so that the cover 48 may fit tight in its opening of the cabinet 46.

In the operation of the hereindescribed refrigerating device the same should be conditioned before application of the heat so as to insure the condenser-evaporator being free of any of the absorbent liquid, and likewise to return all of the ammonia to the generator-absorber. To effect this conditioning the device is placed in the position shown in Fig. 7. This drains the condenser-evaporator, and such liquid as may be therein will pass back to the generator-absorber through the vapor return tube 30. Before assuming the position shown in Fig. 7, the ice tray 34 should be removed from its shell 33.

After proper lapse of the necessary time for draining, the device is righted and placed in the position shown in Fig. 6. In this position all of the liquid is within the generator-absorber, and the condenser-evaporator is disposed within the bucket 44 or similar receptacle which is provided with the required quantity of cold water to cool the condenser-evaporator 28. The burner 15 of the heating element 14 is now lighted and the burner placed beneath the generator-absorber 10 so that the upper end of the burner will fit into the shell 12 and the combustion chamber formed thereby. As the temperature of the generator-absorbed 10 is raised, together with its liquid contents, by the heat of the burner 15, the ammonia of the liquid within the generator-absorber is released and the ammonia gases rise upwardly and pass through the gas tube 22 into the seal 21 which, as before stated, serves as a rectifier or analyzer. Such of the absorbent as passes off with the ammonia vapors will be held or entrained in the seal 21 and become a part of the liquid constituting that seal, until the amount of the liquid is in excess of the required quantity, whereupon the surplus of the absorbent will pass back through the gas tube 22 into the generator-absorber. When pressure has risen to a sufficient degree the ammonia gas will be forced downwardly through the tube 23 into the liquid of the seal, passing also through the connecting nipple 25 to the delivery tube 24, and will rise through the liquid of the seal to the upper end of the tube 24. The gas will then pass out of the discharge ports 26 into the surge chamber 20 to be conducted therefrom by the vapor delivery tube 29 to the condenser-evaporator 28. When the gas enters the condenser-evaporator 28, which now is of relatively low temperature due to the body of cold water in which it is submerged, the gas is condensed and a body of liquid ammonia is built up. This action continues until the burner 15 goes out, thus indicating the termination of the heating or generating cycle.

It will be understood that at this time the lower end of the vapor return tube 30, the lower end of the vapor delivery tube 29, and the lower end of the drain pipe 27 are all covered and sealed by the liquid in which they are submerged. But the end of the vapor return pipe 30 being submerged by less liquid than the ends of the pipes 29 and 27, there is less resistance to the passage of the ammonia gas from the condenser-evaporator, on its return during the absorbing or refrigerating cycle, than there is to the return of the gas through the pipes 27 and 29. Moreover, the return of the gas through the vapor delivery pipe 29 is also resisted by the seal 21.

The condenser-evaporator 28 is now removed from the bucket 44, and the position of the refrigerating device reversed so as to permit the generator-absorber 10 to be submerged in the cold water of the bucket 44. After the generator-absorber has remained in the water a sufficient time, the water contacting the outer surfaces of the generator-absorber and also filling the flues 13, the temperature of the generator-absorber is reduced. This results in a sudden cooling of the liquid remaining in the generator-absorber 10 and the pressure is reduced accordingly, setting up a violent boiling of the refrigerant in the condenser-evaporator 28 and causing the gases formed by such boiling to carry the latent heat back from the condenser-evaporator 28 through the vapor return tube 30 to the interior of the generator-absorber 10. After the generator-absorber 10 has been removed from the cooling water the air contacting the surfaces of the generator-absorber and also flowing through the flues 13 thereof will continue to maintain the generator-absorber at a reduced temperature. The refrigerating effect of the ammonia in the condenser-evaporator 28 will be evidenced by the deposit of frost on the condenser-evaporator. The tray 34 now may be filled with water and placed in its shell 33, and thereupon the unit is applied to the refrigerator cabinet 46, with the condenser-evaporator 28 located therein as shown in Fig. 5. As the refrigerating cycle continues the ammonia passes from the condenser-evaporator 28 back to the generator-absorber and becomes absorbed by the liquid therein, and this continues until the ammonia in the condenser-evaporator has entirely evaporated. The ceasing of the refrigerating effect is evidenced by the defrosting of the condenser-evaporator 28. When this occurs it is necessary to subject the device to the heat application in order to bring over again the ammonia from the generator-absorber to the condenser-evaporator. But before applying the heat the device again must be conditioned by placing it in the position shown in Fig. 7 so as to drain the condenser-evaporator completely of any absorbent that may remain therein.

The entire unit is built of seamless steel tubing and deep drawn shells and is welded to insure gas and liquid-tight joints.

The generator-absorber herein shown and described provides a construction by which much more rapid evaporation of the ammonia on the heating cycle and corresponding rapid cooling on the absorbing or refrigerating cycle are attained, and actual refrigeration is produced thereby in greatly decreased time.

Furthermore, the provision of the surge chamber prevents the absorbent passing over to the condenser-evaporator in the event of sudden expansion of the liquid in the generator-absorber.

The novel seal of the unit removes to a higer degree the absorbing liquid from the generated gases, thus assuring a purer refrigerant reaching the condenser-evaporater.

I claim:

1. In a refrigerating device, the combination with a generator-absorber, and a condenser-evaporator, of means connecting the same and defining a path for the flow of the generated gases from the generator-absorber to the condenser-evaporator, and also a separate path for the flow from the condenser-evaporator to the generator-absorber of the gases to be absorbed, an expansion chamber arranged in the path of the generated gases for controlling and dispersing the surge incident to expansion of the liquid of the generator-absorber, and a drain pipe having one end connected to the bottom of the expansion chamber for returning to the generator-absorber the liquid intercepted by said expansion chamber, the discharge end of said drain pipe being at a low point in the generator-absorber and sealed by the liquid contents of the generator-absorber.

2. In a refrigerating device, the combination with a generator-absorber having a reentrant portion defining an inset combustion chamber at its lower end, of a liquid fuel burner element fitted to said combustion chamber and in communication with the latter, the upper end of the burner element lying within and fitting closely against the lower end of said combustion chamber, whereby said burner element in its relation to said generator-absorber is freed from external drafts at the combustion chamber.

3. In a refrigerating device, the combination with a generator-absorber having a combustion chamber, and a plurality of flues passing through the generator-absorber and in communication with said combustion chamber, of a burner element fitted to said combustion chamber and in communication with the latter, the upper end of the burner element lying within and fitting closely against the lower end of said combustion chamber, whereby said burner element in its relation to said generator-absorber is freed from external drafts at the combustion chamber.

4. In a refrigerating device, the combination with a generator-absorber having an insert combustion chamber, of a burner element fitted to said combustion chamber, the upper end of the burner element lying within and fitting closely against the lower end of said combustion chamber, and a plurality of flues passing through the generator-absorber and in communication with said combustion chamber.

5. In a refrigerating device, the combination with a generator-absorber, and a condenser-evaporator, of means connecting the same and defining a path for the flow of the generated gases from the generator-absorber to the condenser-evaporator, and also a separate path for the flow from the condenser-evaporator to the generator-absorber of the gases to be absorbed, a rectifier in the path of the generated gases and including a chamber enclosing connected receiving and delivery tubes, the receiving tube being in communication with the generator-absorber, and the delivery tube being in communication with the path for the flow of the generated gases from the generator-absorber to the condenser-evaporator.

6. In a refrigerating device, the combination with a generator-absorber, and a condenser-evaporator, of means connecting the same and defining a path for the flow of the generated gases from the generator-absorber to the condenser-evaporator, and also a path for the flow from the condenser-evaporator to the generator-absorber of the gases to be absorbed, of a rectifier in the path of the generated gases and including a chamber having connected receiving and delivery tubes, a gas pipe fitted within the receiving tube and in communication with the interior of the generator-absorber, the discharge end of said gas pipe serving to define the level of a water seal within said receiving tube, the delivery tube being in communication with the path for the flow of the generated gases from the generator-absorber to the condenser-evaporator.

7. In a refrigerating device, the combination with a generator-absorber, a condenser-evaporator, a vapor delivery pipe in communication with the generator-absorber and the condenser-evaporator, and a vapor return pipe also in communication with the generator-absorber and the condenser-evaporator, of a receptacle adapted to contain a cooling agent in which the condenser-evaporator is submerged for effecting condensation of the generated gases, a support for the refrigerating device and for said receptacle including a base, a shelf arranged above the base, a supporting standard interposed between the base and said shelf for sustaining the receptacle in elevated relation to the base, a second supporting standard associated with the base, and a handle member carried by the vapor delivery and vapor return pipes and detachably engaged with said second supporting member, whereby the latter supports the refrigerating device with the condenser-evaporator submerged in the cooling agent.

8. In a refrigerating device, the combination with a generator-absorber, a condenser-evaporator, a vapor delivery pipe in communication with the generator-absorber and the condenser-evaporator, and a vapor return pipe also in communication with the generator-absorber and the condenser-evaporator, of a receptacle adapted to contain a cooling agent in which the condenser-evaporator is submerged for effecting condensation of the generated gases, a support for the refrigerating device and for said receptacle including a base, a shelf arranged above the base, a supporting standard interposed between the base and said shelf for sustaining the receptacle in elevated relation to the base, a second supporting standard associated with the base, and a handle member carried by the vapor delivery and vapor return pipes and including a frame having aligned openings in its ends for receiving the vapor delivery and vapor return pipes, and a handle mounted in said frame, said frame being also perforated for detachably receiving the end of said second supporting standard, whereby the latter supports the refrigerating device with the condenser-evaporator submerged in the cooling agent.

CLARENCE T. SORENSEN.